United States Patent [19]

Morimura

[11] Patent Number: 5,455,621
[45] Date of Patent: Oct. 3, 1995

[54] IMAGING METHOD FOR A WIDE DYNAMIC RANGE AND AN IMAGING DEVICE FOR A WIDE DYNAMIC RANGE

[75] Inventor: Atsushi Morimura, Nara, Japan

[73] Assignee: Matsushita Electric Industrial Co., Ltd., Kadoma, Japan

[21] Appl. No.: 142,695

[22] Filed: Oct. 25, 1993

[30] Foreign Application Priority Data

Oct. 27, 1992 [JP] Japan .................................. 4-288508

[51] Int. Cl.⁶ .............................. H04N 5/235; H04N 5/57
[52] U.S. Cl. .................... 348/229; 348/221; 348/222; 348/230; 348/362
[58] Field of Search ................................. 348/297, 362, 348/438, 678, 680, 221, 222, 224, 229; H04N 5/235, 5/57

[56] References Cited

U.S. PATENT DOCUMENTS

| | | | |
|---|---|---|---|
| 5,089,890 | 2/1992 | Takayama | 348/678 |
| 5,138,458 | 8/1992 | Nagasaki et al. | 358/209 |
| 5,162,914 | 11/1992 | Takahashi et al. | 348/362 |
| 5,264,944 | 11/1993 | Takemura | 348/224 |

FOREIGN PATENT DOCUMENTS

| | | | |
|---|---|---|---|
| 0244230 | 11/1987 | European Pat. Off. | H04N 3/15 |
| 0290264 | 11/1988 | European Pat. Off. | H04N 5/243 |
| 0487332 | 5/1992 | European Pat. Off. | H04N 3/15 |
| 63-123282 | 7/1988 | Japan | H04N 5/335 |
| 63-306779 | 12/1988 | Japan | H04N 5/235 |
| 1-204579 | 8/1989 | Japan | H04N 5/335 |
| 2107076 | 4/1990 | Japan | H04N 5/335 |

OTHER PUBLICATIONS

Otsubo, The Journal of the Institute of Television Engineers of Japan, vol. 45, No. 9, 1991, pp. 1060–1066.
Nakayama et al., The Journal of the Institute of Television Engineers of Japan, vol. 45, No. 9, 1991, pp. 1080–1088.

Primary Examiner—Joseph Mancuso
Assistant Examiner—Andrew B. Christensen
Attorney, Agent, or Firm—Renner, Otto, Boisselle & Sklar

[57] ABSTRACT

A method for producing an image with a wide dynamic range using an imaging element in which periods for accumulating charges can be varied in one field is disclosed. The method includes the steps of: reading a charge stored in the imaging element in a first period of the field as a first signal; reading a charge stored in the imaging element in a second period of the field as a second signal, the second period being different from the first period; applying a first weight to the first signal in accordance with the level of the first signal; applying a second weight to the second signal in accordance with the level of the second signal; producing a synthesized signal by synthesizing the weighted first signal and the weighted second signal; and compressing the level of the synthesized signal to a predetermined standard level.

10 Claims, 13 Drawing Sheets

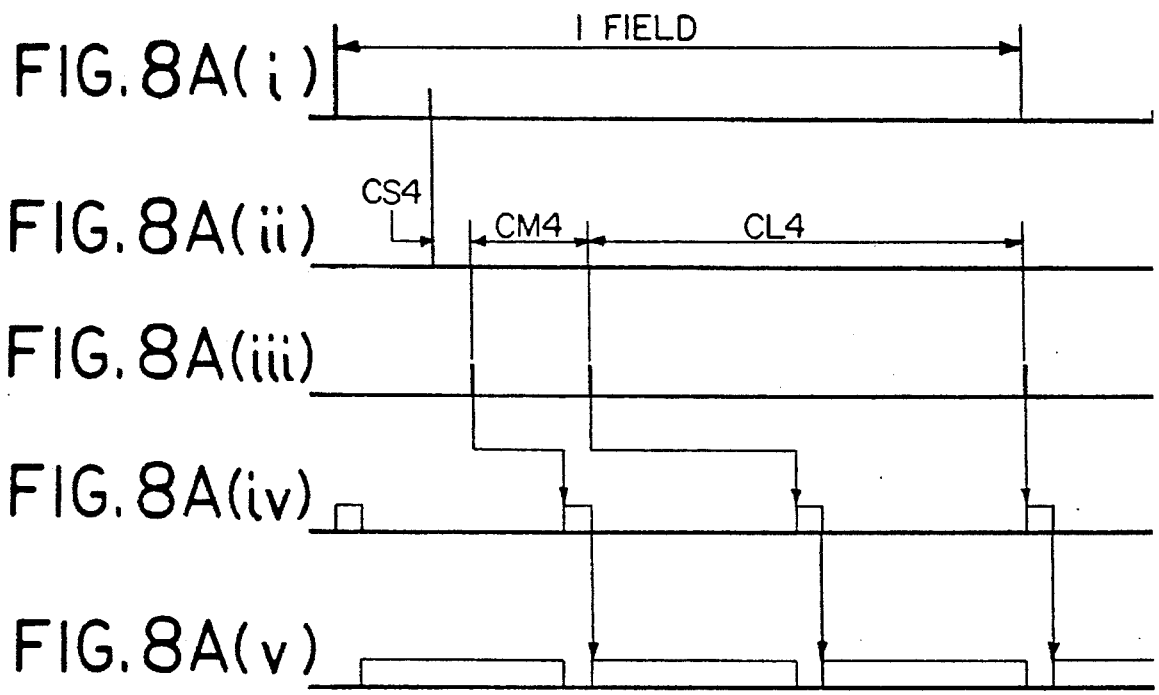
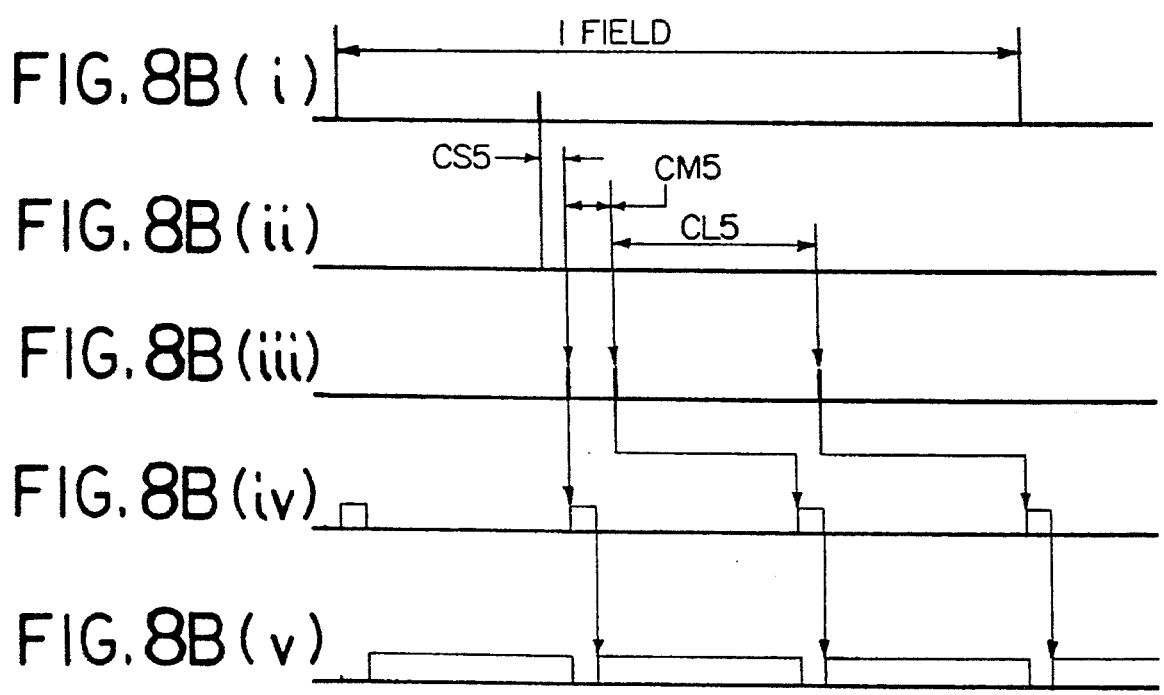

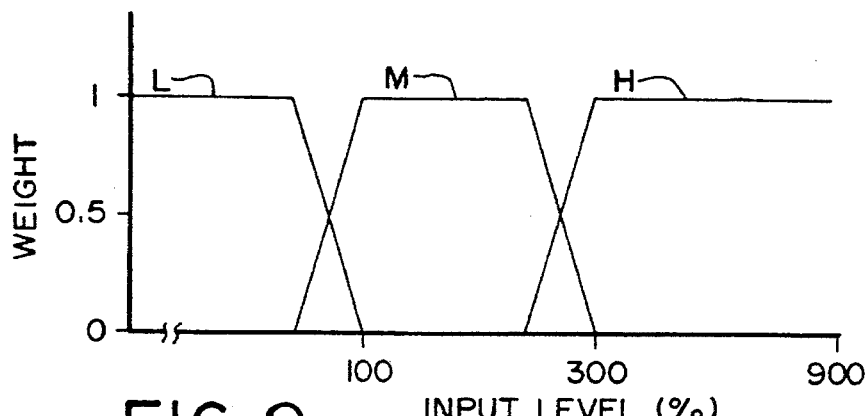
FIG. 9
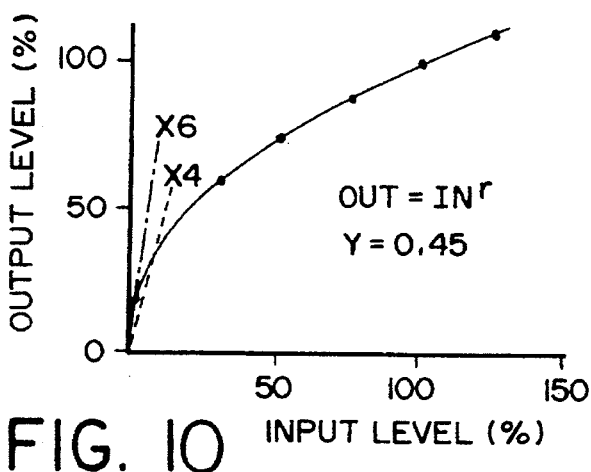
FIG. 10
FIG. 12
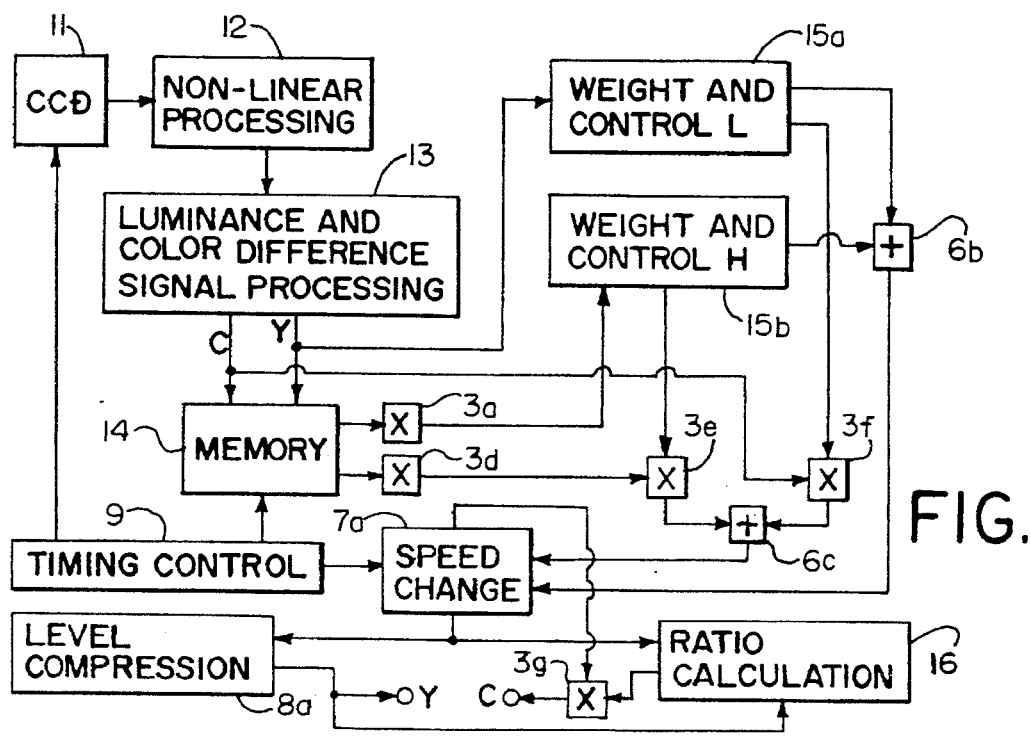
FIG. 11

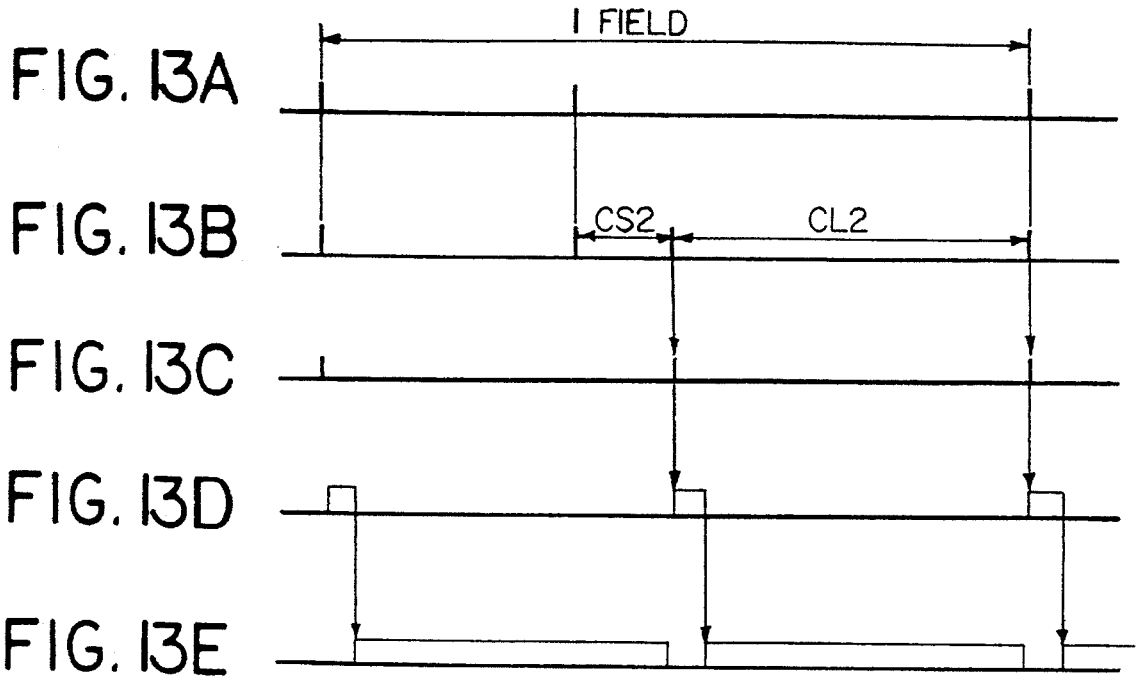
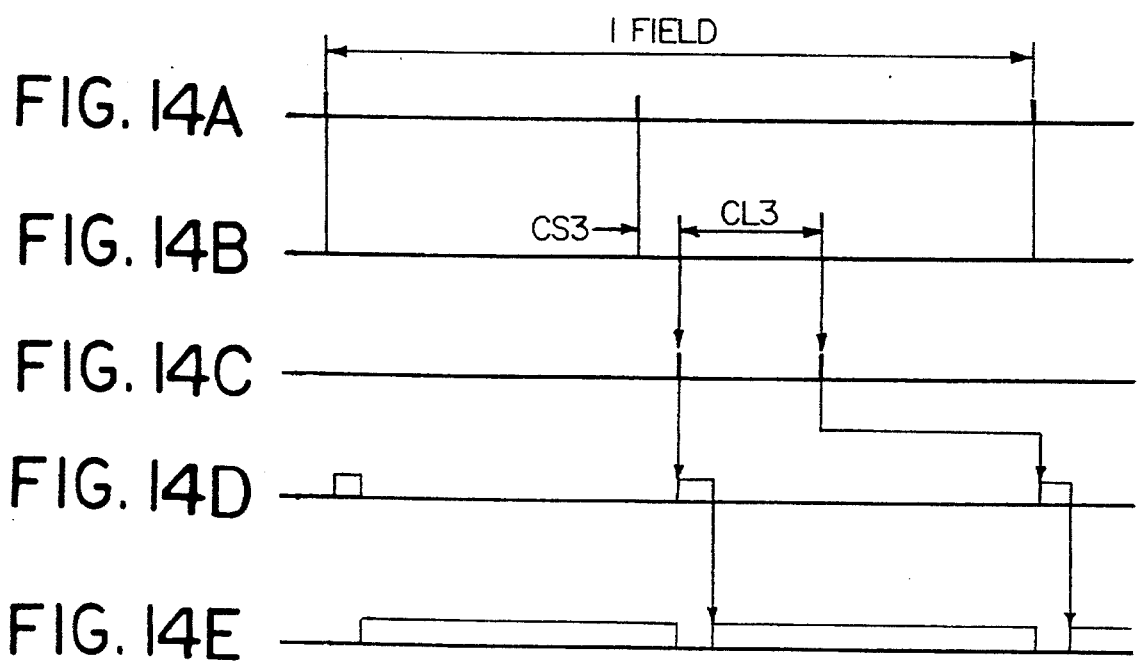

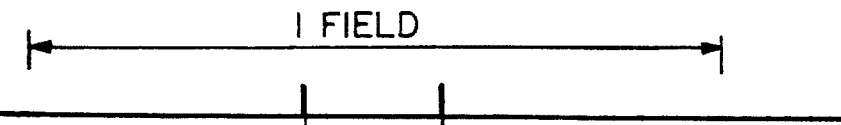
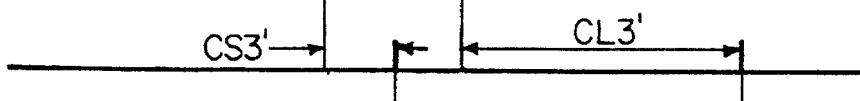
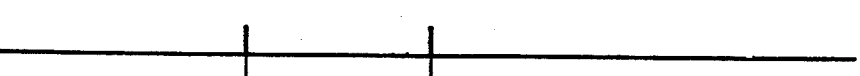
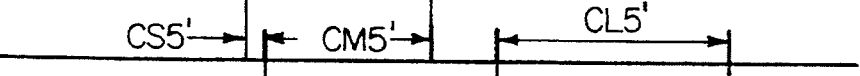
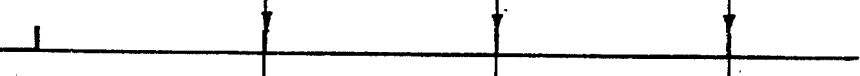
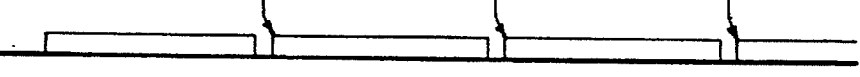
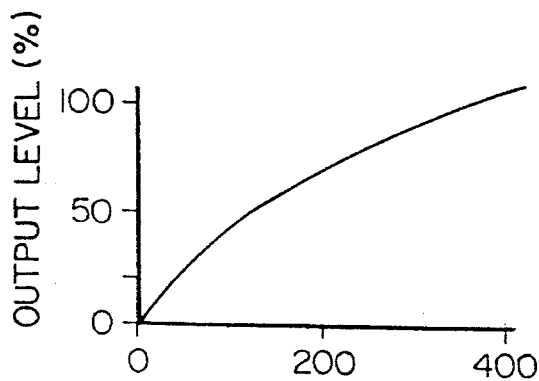
FIG. 16A
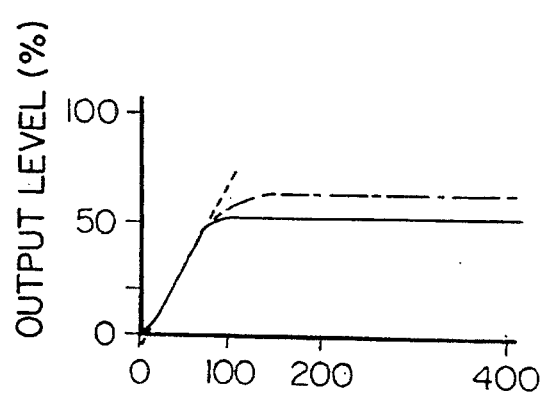
FIG. 16B

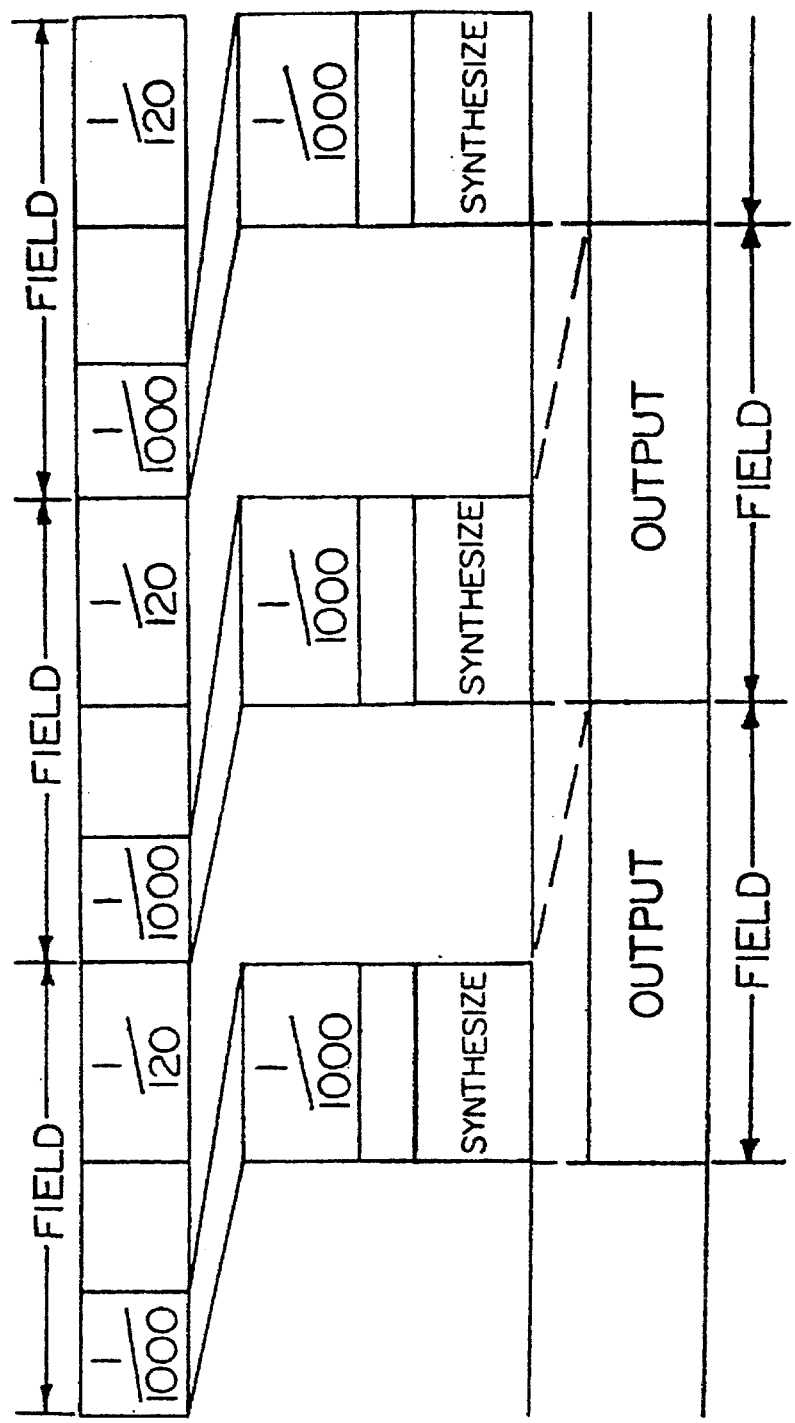
FIG. 18 (1) PRIOR ART
FIG. 18 (2) PRIOR ART
FIG. 18 (3) PRIOR ART
FIG. 18 (4) PRIOR ART

IMAGING METHOD FOR A WIDE DYNAMIC RANGE AND AN IMAGING DEVICE FOR A WIDE DYNAMIC RANGE

BACKGROUND OF THE INVENTION

1. Field of the Invention

The present invention relates to an imaging and synthesizing method for a wide dynamic range and an imaging device for a wide dynamic range, for imaging an object having a light intensity of wide dynamic range in the natural world, without resulting in white saturation or black level cutoff. "White saturation", as used herein, refers to the phenomena in which an increase in the signal level output from the imaging element does not result in any appreciable increase in the light intensity. "Black level cutoff", on the other hand, is used herein to refer to the phenomena in which a reduction in the signal level output from the imaging element does not result in an appreciable decrease in the light intensity.

2. Description of the Related Art

In a conventional technique such as disclosed in Japanese Laid-Open Patent Publication No. 63-306779, the exposure amount (i.e., a charge accumulation period) of an imaging device is controlled, so as to successively synthesize images, thereby accommodating the imaging device to a moving picture. FIG. 17 shows a construction of an imaging device for implementing the conventional technique. The imaging device shown in FIG. 17 includes an imaging element (CCD) 205, a signal processing circuit 204, an A to D converter 201, a control circuit 202, a field memory 206, a switching circuit 208, a field memory 207, and a D to A converter 203. The concept of the conventional imaging device for a wide dynamic range is briefly described with reference to FIG. 18.

As shown in (1) of FIG. 18, the imaging is sequentially performed while the charge accumulation period of the imaging device (CCD) 205 is switched between 1/1000 sec. and 1/120 sec. An image obtained for the charge accumulation period of 1/1000 sec. is temporarily stored in the field memory 206. At the timing of an image obtained for the charge accumulation period of 1/120 sec., the stored image which has been obtained for the charge accumulation period of 1/1000 sec. is read out from the field memory 206. The period of 1/120 sec. and the period of 1/1000 sec. are switched (synthesized) depending on the conditions, and the resulting image is written into the field memory 207 ((2) of FIG. 18). Although the switching condition described in the specification includes an inconsistency, it is presumed as follows. If the switching condition that the white saturation occurs in the image obtained for the charge accumulation period of 1/120 sec. and that the black level cutoff is not caused in the image obtained for the charge accumulation period of 1/1000 sec. is satisfied, an image obtained for the charge accumulation period of 1/120 sec. is switched to an image obtained for the charge accumulation period of 1/1000 sec. In this way, the control circuit 202 performs the switching and synthesizing operation of the images ((3) of FIG. 18). For the synthesized image signal, the speed thereof is changed in the field memory 207, so that the scanning speed is changed so as to be the speed of a usual TV signal. Then, the synthesized image signal is output ((4) of FIG. 18).

By synthesizing the images according to the above method, an image which may conventionally include white saturation or black level cutoff is replaced with an image obtained for a different charge accumulation period, so that the dynamic range of the image can be widened.

However, by the method shown in FIG. 17, the output images are constituted by extracting images without resulting in white saturation and black level cutoff. Accordingly, if the output images exhibit high contrast and the signal levels thereof continuously change, the output images may include discontinuity between the extracted images. Thus, the image quality is deteriorated.

If the object is moving, the periods for photoelectric conversion of images are not successive, so that a single object may be observed as plural separate objects in the synthesized images.

SUMMARY OF THE INVENTION

The method for producing an image with a wide dynamic range using an imaging element in which periods for accumulating charges can be varied in one field of this invention, includes the steps of: reading a charge stored in the imaging element in a first period of the field as a first signal; reading a charge stored in the imaging element in a second period of the field as a second signal, the second period being different from the first period; applying a first weight to the first signal in accordance with a level of the first signal; applying a second weight to the second signal in accordance with a level of the second signal; producing a synthesized signal by synthesizing the weighted first signal and the weighted second signal; and compressing a level of the synthesized signal to a predetermined standard level.

In one embodiment of the invention, in one field, the first period precedes the second period in time, and the first period is shorter than the second period.

In another embodiment of the invention, the first period and the second period are substantially continuous or adjacent.

In another embodiment of the invention, when the first period is shorter than the second period, the step of applying a first weight includes the step of applying a larger weight to a higher level of the first signal, and the step of applying a second weight includes the step of applying a larger weight to a lower level of the second signal.

In another embodiment of the invention, the method further includes the steps of: reading a charge stored in the imaging element in a third period of the field as a third signal, the third period being different from the first and second periods; and applying a third weight to the third signal in accordance with a level of the third signal, wherein the step of producing a synthesized signal includes the step of producing a synthesized signal by synthesizing the weighted first signal, the weighted second signal, and the weighted third signal.

In another embodiment of the invention, when the first period is shorter than the second period, and the second period is shorter than the third period, the step of applying a first weight includes the step of applying a larger weight to a higher level of the first signal, the step of applying a second weight includes the step of applying a larger weight to an intermediate level of the second signal, and the step of applying a third weight includes the step of applying a larger weight to a lower level of the third signal.

In another embodiment of the invention, the compressing step includes the steps of: separating the synthesized signal based on respective frequency components; compressing, for lower frequency components of the synthesized signal, the signal over all levels of the signal; compressing, for intermediate frequency components of the synthesized signal, the signal when a level of the signal has a predetermined first value or less, and clipping the signal when the level of the signal exceeds the predetermined first value; and compressing, for higher frequency components of the synthesized signal, the signal when a level of the signal has a predetermined second value or less, and clipping the signal when the level of the signal exceeds the predetermined second value, the predetermined first value being larger than the predetermined second value.

According to another aspect of the invention, an imaging device for producing an image with a wide dynamic range using an imaging element in which periods for accumulating charges can be varied in one field is provided. The imaging device includes: means for reading a charge stored in the imaging element in a first period of the field as a first signal; means for reading a charge stored in the imaging element in a second period of the field as a second signal, the second period being different from the first period; means for applying a first weight to the first signal in accordance with a level of the first signal; means for applying a second weight to the second signal in accordance with a level of the second signal; means for producing a synthesized signal by synthesizing the weighted first signal and the weighted second signal; and means for compressing a level of the synthesized signal to a predetermined standard level.

In one embodiment of the invention, in one field, the first period precedes the second period in time, and the first period is shorter than the second period.

In another embodiment of the invention, the first period and the second period are substantially continuous or adjacent.

In another embodiment of the invention, when the first period is shorter than the second period, the means for applying a first weight applies a larger weight to a higher level of the first signal, and the means for applying a second weight applies a larger weight to a lower level of the second signal.

In another embodiment of the invention, the imaging device further includes: means for reading a charge stored in the imaging element in a third period of the field as a third signal, the third period being different from the first and second periods; and means for applying a third weight to the third signal in accordance with a level of the third signal, wherein the means for producing a synthesized signal produces a synthesized signal by synthesizing the weighted first signal, the weighted second signal, and the weighted third signal.

In another embodiment of the invention, when the first period is shorter than the second period, and the second period is shorter than the third period, the means for applying a first weight applies a larger weight to a higher level of the first signal, the means for applying a second weight applies a larger weight to an intermediate level of the second signal, and the means for applying a third weight applies a larger weight to a lower level of the third signal.

In another embodiment of the invention, the compressing means includes: means for separating the synthesized signal based on respective frequency components; means for compressing, for lower frequency components of the synthesized signal, the signal over all levels of the signal; means for compressing, for intermediate frequency components of the synthesized signal, the signal when a level of the signal has a predetermined first value or less, and clipping the signal when the level of the signal exceeds the predetermined first value; and means for compressing, for higher frequency components of the synthesized signal, the signal when a level of the signal has a predetermined second value or less, and clipping the signal when the level of the signal exceeds the predetermined second value, the predetermined first value being larger than the predetermined second value.

Thus, the invention described herein makes possible the advantages of (1) providing an imaging and synthesizing method for a wide dynamic range and an imaging device for a wide dynamic range capable of outputting images in which the signal levels of the imaged and synthesized images are continuous in all the ranges for all the images with high contrast, (2) providing an imaging and synthesizing method for a wide dynamic range and an imaging device for a wide dynamic range in which the periods for photoelectric conversion of images are controlled to be successive, so that a single object is not erroneously observed as plural separate objects in the synthesized image, and (3) providing an imaging and synthesizing method for a wide dynamic range and an imaging device for a wide dynamic range capable of performing the imaging with a wide dynamic range and performing the imaging of a color image.

These and other advantages of the present invention will become apparent to those skilled in the art upon reading and understanding the following detailed description with reference to the accompanying figures.

BRIEF DESCRIPTION OF THE DRAWINGS

FIGS. 8A($i$)–8A($v$) are diagrams schematically showing the driving timing of an imaging element.

FIG. 9 is a diagram showing the characteristics of level weighting.

FIG. 10 is a diagram showing exemplary characteristics of level compression.

FIG. 11 is a block diagram showing a construction of an imaging device for a wide dynamic range in a third example according to the invention.

FIG. 12 shows an exemplary construction of color filters of an imaging element.

FIGS. 13A–13E are diagrams schematically showing the driving timing of the imaging element.

FIGS. 14A–14E are diagrams schematically showing the driving timing of the imaging element.

FIGS. 15A–15H are diagrams schematically showing the driving timing of the imaging element.

FIGS. 16A to 16C are diagrams showing exemplary characteristics of level compression.

FIGS. 18(1)–18(4) are diagrams for illustrating the operation of the conventional imaging device.

DESCRIPTION OF THE PREFERRED EMBODIMENTS

The present invention will be described by way of examples with reference to the drawings.

EXAMPLE 1

Figure 1:
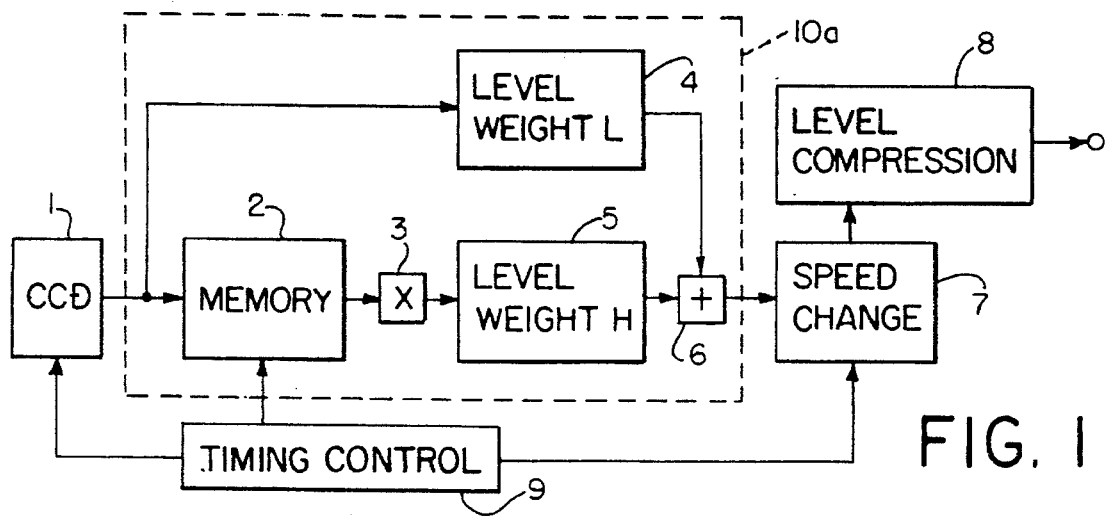
FIG. 1 is a block diagram showing a construction of an imaging device for a wide dynamic range in a first example according to the invention.
Figure 2A:
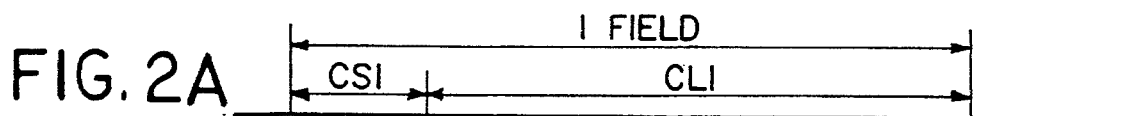
FIGS. 2A–2D are diagrams schematically showing the outline of the driving timing of an imaging element.
Figure 2B:
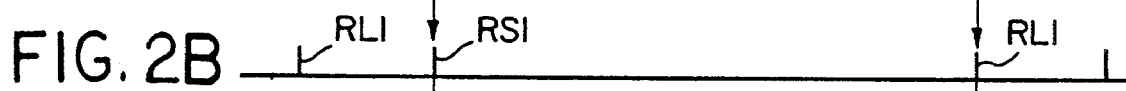
Figure 2C:
Figure 2D:
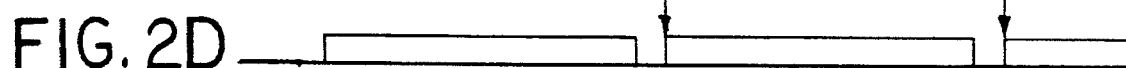

FIG. 1 shows a construction of an imaging device for a wide dynamic range in a first example according to the invention. In FIG. 1, the imaging device of the first example includes an imaging device (CCD) 1 for performing a photoelectric conversion for the object to be imaged, a memory 2 for storing the converted image signal, a multiplier 3 for multiplying the level of the image signal by a constant, level weight L and H sections 4 and 5 for applying a weight to the image signal according to the level of the image signal, an adder 6 for adding the weighted image signals to each other, a speed change section 7 for changing the speed of the image signal, a level compressing section 8 for compressing the level of the image signal, and a timing control section 9 for controlling the timing of each block.

The operation of the imaging device for a wide dynamic range of the first example of the invention will be described below.

The image of an object including different light intensities is formed on an imaging portion of an imaging element (hereinafter referred to as the CCD) 1, and the light intensities are converted into electric signals (electric charges). The amount of electric charges is in proportion to the light intensity, and the electric charges which are obtained in a prescribed period (a charge accumulation period) are converted into a voltage which is output as an electric signal. Therefore, in the case where the charge accumulation period is set to be short, saturation of signal does not occur, even if the light intensity is very high. In the case where the charge accumulation period is set to be long, a sufficiently high-level signal can be obtained even if the light intensity is very low. Such a CCD is a very common device, so that the explanation of the basic operation thereof is omitted. The timing controller 9 first controls the length of the charge accumulation period (the photoelectric conversion period) of the CCD 1.

FIGS. 2A–2D show the control timings. FIGS. 2A–2D show, respectively from the top, the charge accumulation period, the signal read pulse, the signal charge high-speed transfer period, and the signal readout period. In the charge accumulation period, a short period CS1 and a long period CL1 are alternately repeated, and the total of the periods CS1 and CL1 substantially constitutes one field period.

Figure 3:
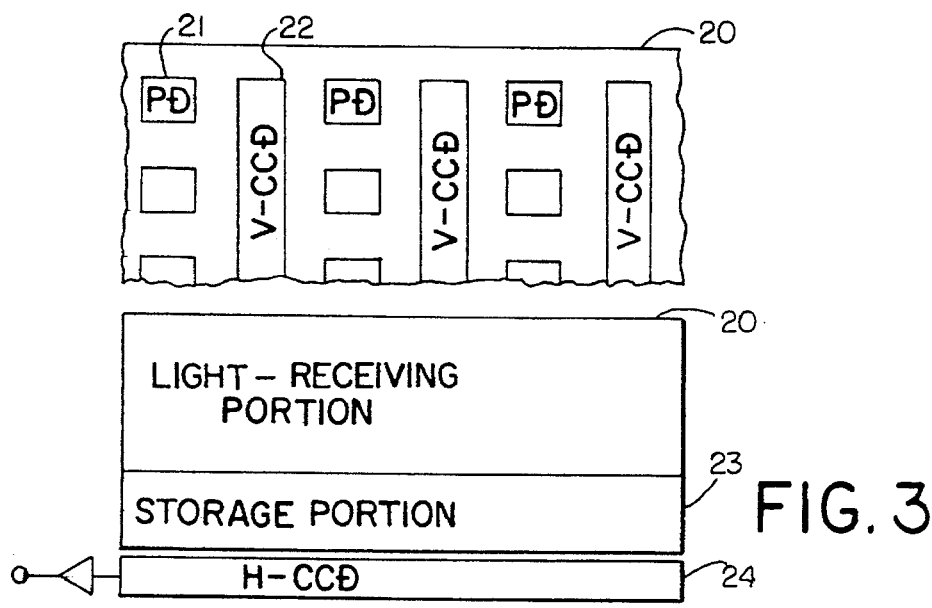
FIG. 3 schematically shows a construction of the imaging element.

FIG. 3 schematically shows a construction of the CCD 1. The CCD 1 includes photodiodes (photoelectric converting portions, hereinafter referred to as PDs) 21, vertical CCDs 22, a storage portion 23, a horizontal CCD 24, and a light-receiving portion 20 for the CCD 1. In the charge accumulation periods CS1 and CL1, the signal charges are gradually accumulated in the PDs 21. The accumulated signal charges are transferred to the vertical CCDs 22 in accordance with the signal read pulses RS1 and RL1. In the case shown in FIG. 2, the signal accumulation periods are determined by the periods of the signal read pulse RS1 and RL1. When the signal is read at the timing of RL1, a high-speed transfer of the signal charge from the vertical CCD 22 to the storage portion 23 is immediately started. When the signal is read at the timing of RS1, at the time when all the signals which were previously read are output to the horizontal CCD 24, a high-speed transfer of the signal charge from the vertical CCD 22 to the storage portion 23 is started. After the signals are transferred to the storage portion 23, the signal is sequentially output from the storage portion 23 through the horizontal CCD 24. The output timing is also shown in FIG. 2. The speed of the signal output is almost twice that compared with the usual speed. This is because two types of signals for different charge accumulation periods are used in one field in this example.

Figure 4:
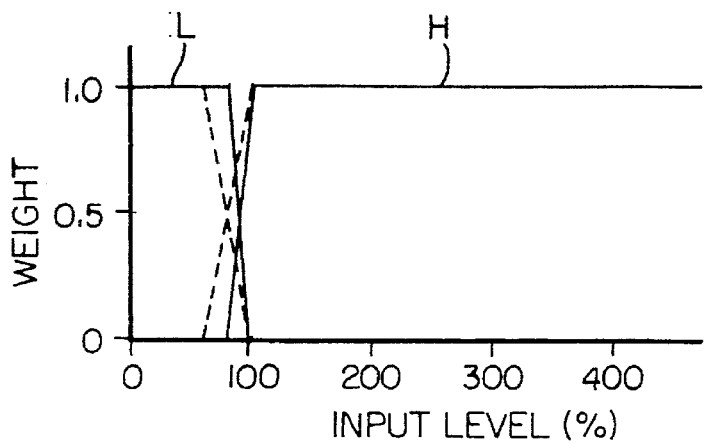
FIG. 4 is a diagram showing the characteristics of level weighting.
Figure 5A:
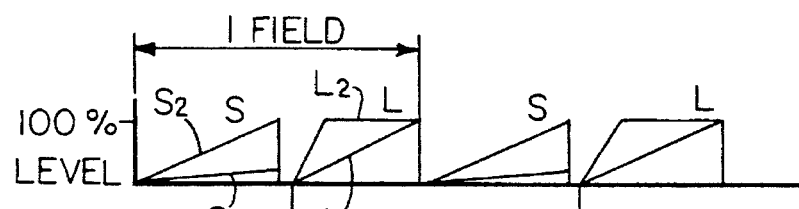
FIGS. 5A–5F are diagrams showing the driving timing of the imaging device.
Figure 5B:
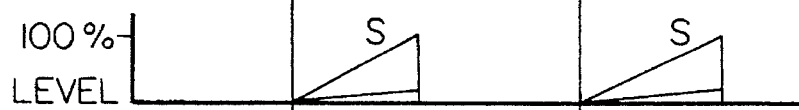
Figure 5C:
Figure 5D:
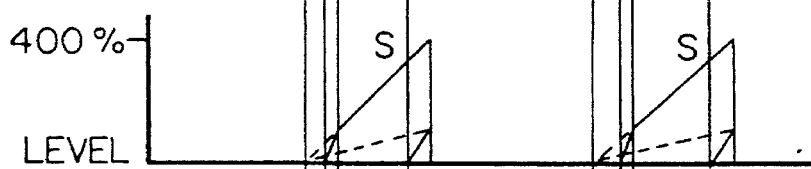
Figure 5E:
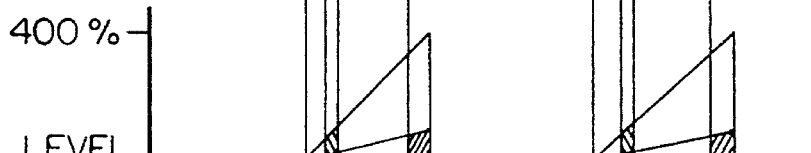
Figure 5F:

A signal of the short charge accumulation period CS1 is read out from the CCD 1 and stored in the memory 2. Then, the signal read out from the memory 2 at the same timing when a signal of the long charge accumulation period CL1 is read out from the CCD 1. The signal read out from the memory 2 is multiplied by a constant by the multiplier 3. The constant used for the multiplication is obtained by CL1/CS1. In this example, it is assumed that the constant is 4. By the multiplication by the constant, the signal levels of the signals of the different charge accumulation periods are made to be equal to each other in principle, except for saturated signals. Next, the level weight H section 5 applies a level weight H to the multiplied signal. The level weight L section 4 applies a level weight L to the signal of the charge accumulation period of CL1. The weight is determined in accordance with the level of the signal. The characteristics of the level weighting are shown in FIG.4. In FIG. 4, the horizontal axis indicates a level of an input signal, and the vertical axis indicates a weight applied to the signal. The level weight L has a value of 1 for the input signal level up to 80%, and linearly decreases in the range of 80% to 100%. Then, the level weight L has a value of 0 at the input level of 100%. On the other hand, the level weight H has a value of 0 for the input signal level up to 80%, and linearly increases in the range of 80% to 100%. Then, the level weight H has a value of 1 at the input level of 100%. For the input levels over 100%, the level weight L has a value of 0 and the level weight H has a value of 1. For any input level, the sum of the level weight L and the level weight H is equal to 1. In the case where the continuity of the signal levels between the images in the different charge accumulation periods is poor, it is possible to improve the continuity by increasing the overlapping portions as shown by the broken line. Thus, weights are applied to the image signals having different dynamic ranges, and the weighted image signals are added to each other by the adder 6, so as to form a single image. By such weighting, images having good conditions (with good S/N ratio and without saturation) are extracted, so that an image with a wide dynamic range is produced. The synthesized image has a speed approximately twice the usual speed at the stage of signal reading of the CCD 1, so that the signal scanning speed is changed to be ½ so as to accommodate with the standard television signal scanning.

FIGS. 5A–5F schematically show the relationships between time and the amplitude of each of signals for various portions. More particularly, FIGS. 5A–5F show, respectively, the outputs of CCD1, memory 2, level weight L section 4, level weight H section 5, adder 6, and speed change section 7. The dimension line in the upper portion of FIG. 5A indicates the period of one field.

It is assumed that there are two types of objects having different brightnesses. More specifically, it is assumed that there are a dark object and a light object whose reflectivities gradually increase in the vertical direction, respectively. In this case, a signal corresponding to the charge accumulation period of CS1 is indicated by S. The signal S includes a dark portion $S_1$ for the dark object and a light portion $S_2$ for the light object. A signal corresponding to the charge accumulation period of CL1 is indicated by L. The signal L includes a dark portion $L_1$ for the dark object and a light portion $L_2$ for the light object. The light portion $S_2$ of the signal S is not saturated while the dark portion $S_1$ thereof has a low signal level and insufficient S/N ratio. The dark portion $L_1$ of the signal L is converted into a signal having sufficient amplitude, while the light portion $L_2$ thereof is saturated. The signal S is shifted along the time axis by the memory 2, so that the signal S is caused to coincide with the signal L. Then, weighting is performed in accordance with the respective levels. Due to the weighting in accordance with the levels, a low-level portion of the signal S is compressed, and a high-level portion of the signal L is also compressed. These compressions are performed in order to synthesize an image without using portions having poor S/N ratio, and portions including saturation. By adding the level-weighted signals to each other, a signal having a wide dynamic range can be produced. Next, the signal which is read out at about double speed is output after the speed thereof is changed to the usual speed. As shown in FIGS. 5A–5F, in cases where the double-speed signal writing is performed at the same time as the output of the signal of usual speed, it is sufficient for a memory for changing the speed to have half the number of pixels in the field.

Figure 6A:
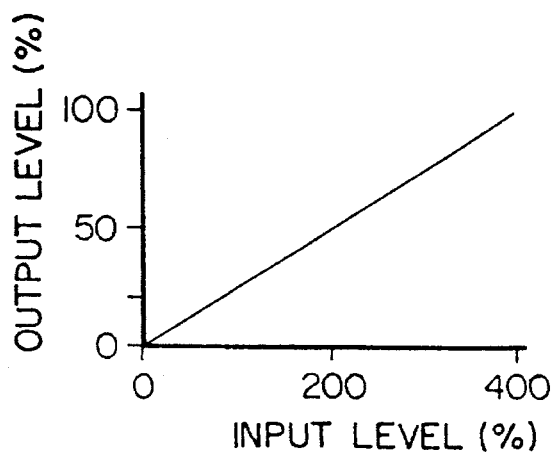
FIGS. 6A to 6C are diagrams showing exemplary characteristics of level compression.
Figure 6B:
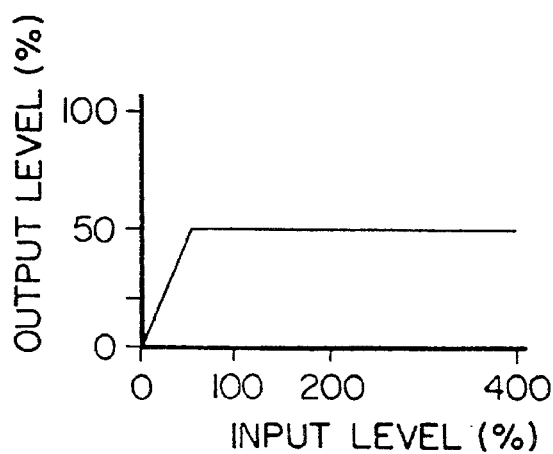
Figure 6C:
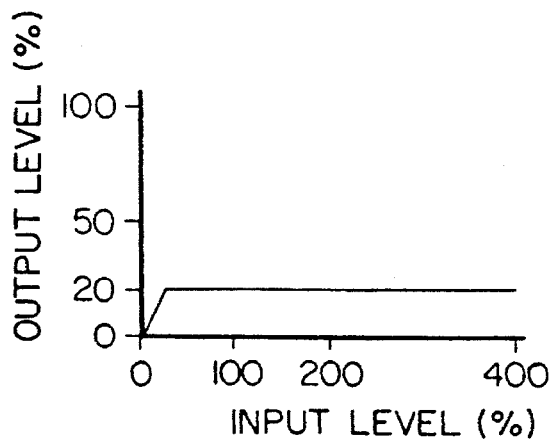

The signal level of the synthesized image may be 400% at the maximum. The signal level is compressed to be 100% by the level compressing section 8. The characteristics of the level compressing section 8 are shown in FIGS. 6A to 6C. The signal input to the level compressing section 8 is classified into frequency components. For example, the case where an NTSC signal is input to the level compressing section 8 is described. For the lower frequency components (about DC—50 Khz), the input signal levels up to 400% are linearly compressed as shown in FIG. 6A. For the intermediate frequency components (about 50 Khz—500 Khz), the input levels of 50% or lower are directly output and the levels above 50% are clipped as shown in FIG. 6B. For the higher frequency components (500 Khz or higher), the levels of 20% or lower are directly output and the levels above 20% are clipped as shown in FIG. 6C.

Figure 19A:
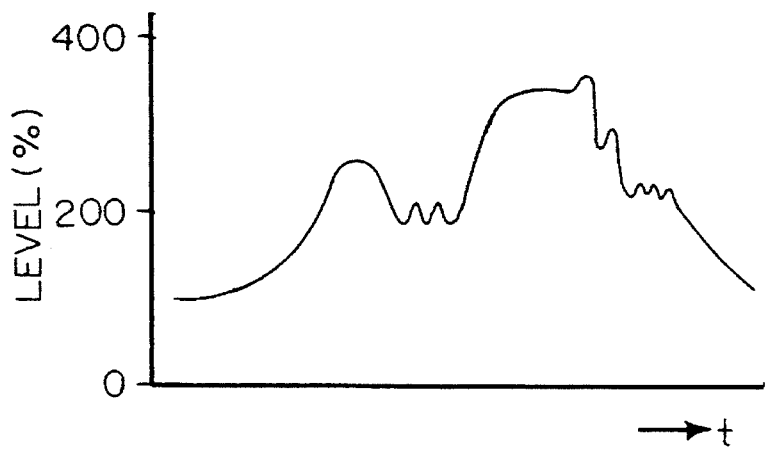
FIGS. 19A through 19E schematically show signal waveforms in the compression process.
Figure 19B:
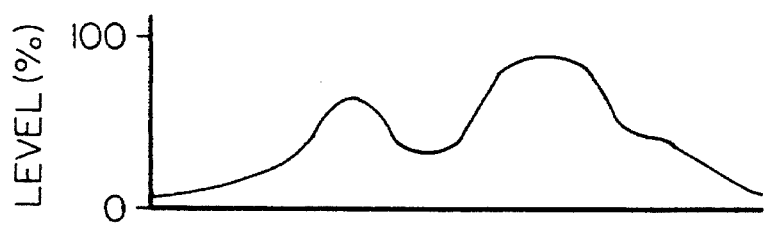
Figure 19C:
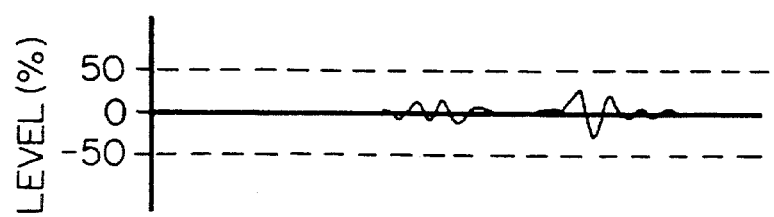
Figure 19D:
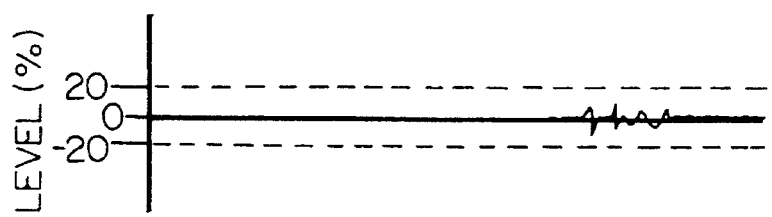

FIGS. 19A to 19E illustrate the waveforms in the compression process by the level compressing section 8. In FIG. 19A, the input signal level has a dynamic range of 400%. In FIG. 19B, the lower frequency components (about DC—50 Khz) are separated and the levels of the lower frequency components are compressed to be ¼. In FIG. 19C, the intermediate frequency components (about 50 Khz—500 Khz) are separated, and the levels of the intermediate frequency components are clipped at an upper limit of the amplitude of 50%. In FIG. 19D, the higher frequency components (500 Khz or higher) are separated, and the levels of the higher frequency components are clipped at an upper limit of the amplitude of 20%.

Figure 19E:
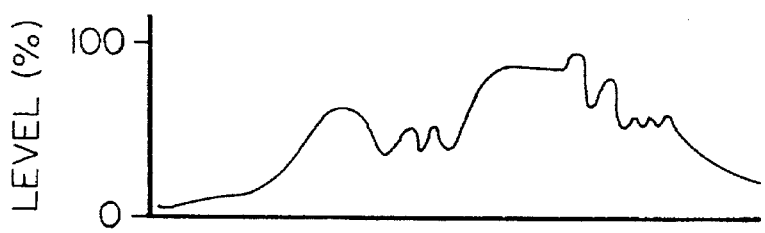

The compression of the levels of the synthesized signal in the above manner makes it possible to output a usual image without unnaturalness due to the compression. In general, the amplitude of the higher frequency components included in the image decreases as the frequency increases. As shown in FIG. 19D, the amplitudes of the higher frequency components (500 Khz or higher) fall within the amplitude range of ±20%. Accordingly, even if the amplitudes of the higher frequency components are clipped at the upper limit of 20%, this causes almost no problem. In addition, as shown in FIG. 19C, the amplitudes of the intermediate frequency components (50 Khz—500 Khz) fall within the amplitude range of ±50%. Accordingly, even if the amplitudes of the intermediate frequency components are clipped at the upper limit of 50%, this causes almost no problem. The absolute levels of the lower frequency components are not so significant for human beings. This is because human beings have high sensitivity with respect to the relative change, but have very low sensitivity with respect to the absolute level. Therefore, for the lower frequency components, there arise no problems due to the compression. FIG. 19E shows the waveform of the signal obtained by adding the signals shown in FIGS. 19B to 19D.

According to the compression mentioned above, the levels of the image can be compressed without applying the impression that the image quality is deteriorated as compared with the image before the compression. On the contrary, if the gain of each frequency component was reduced to be ¼, the sharpness and the contrast would be felt to be degraded, and hence the image quality would be deteriorated.

If the image having the levels of maximum 400% is converted into an image having the levels of 100% by the above compression, such a compression does not cause any unnaturalness. This is because a human being has a very low sensitivity with respect to the absolute level of the luminance, as mentioned above. In addition, the relative changes of the image levels which are felt by the human beings are represented by the intermediate or higher frequency components. Accordingly, when a person observes an image which is compressed according to the invention without reducing the gains of the intermediate or higher frequency components, the image can be observed with a wide dynamic range the same as the image having the signal levels of maximum 400%.

Figure 20A:
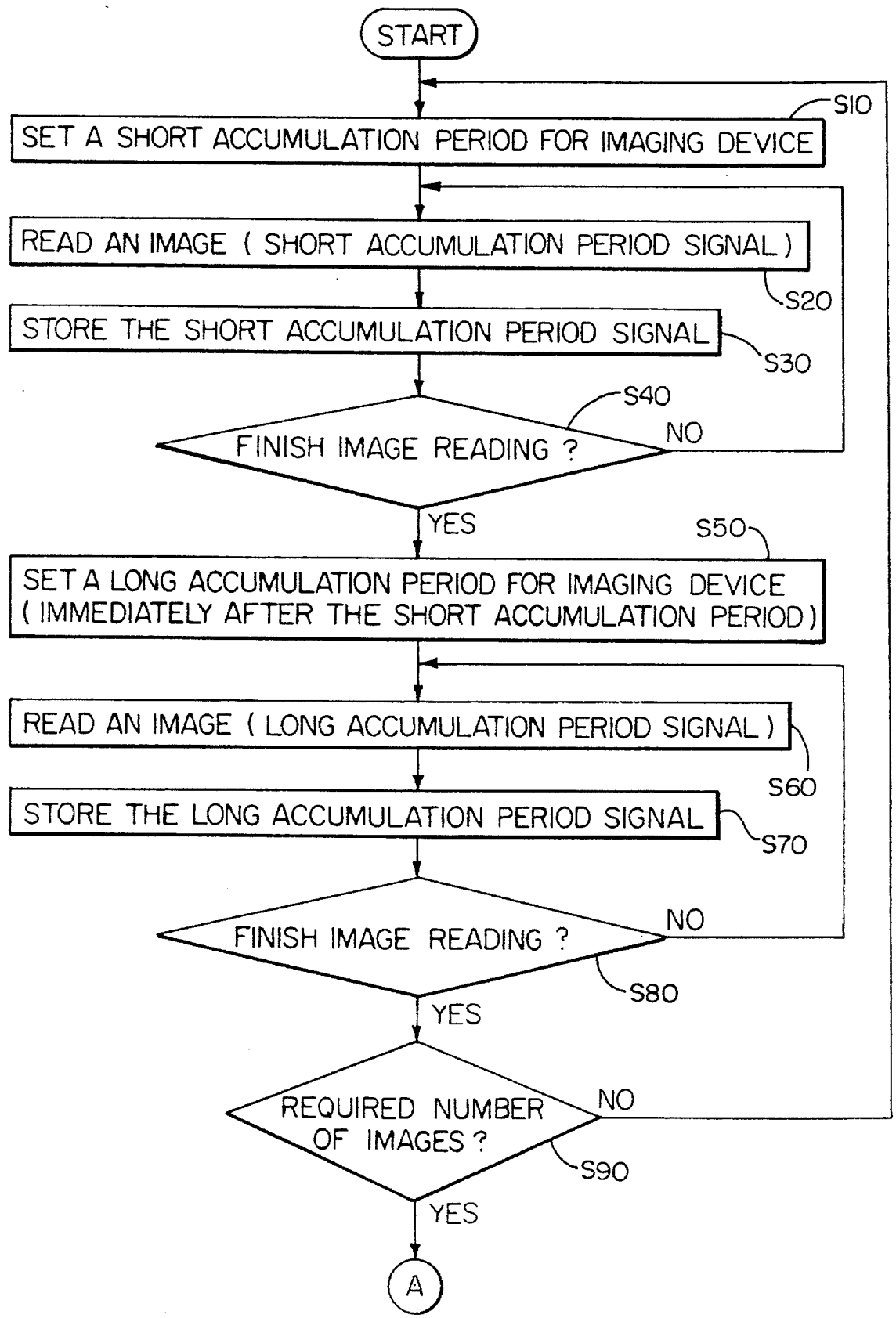
FIGS. 20A to 20C are flowcharts for illustrating the imaging and synthesizing method for a wide dynamic range according to the invention.
Figure 20B:
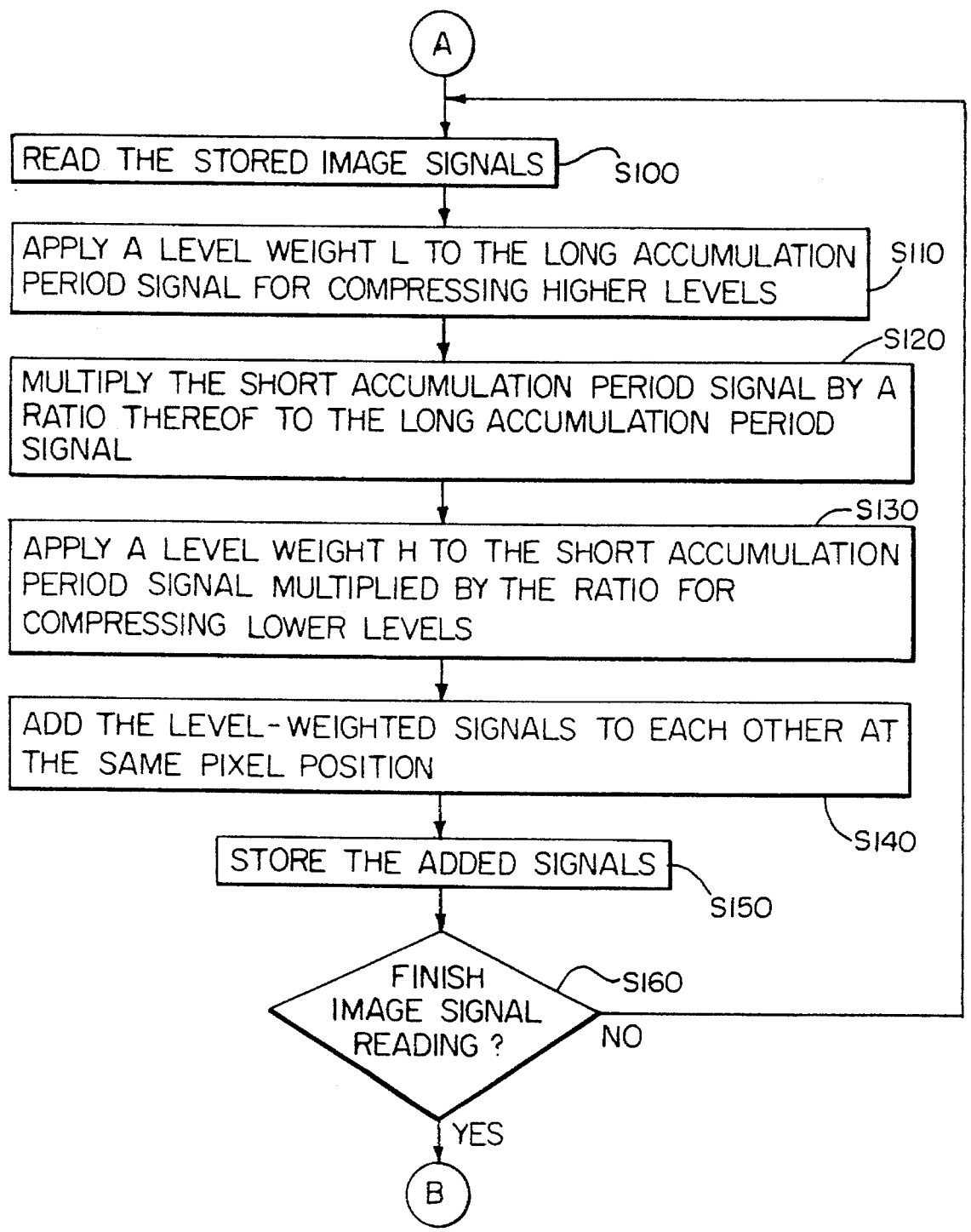
Figure 20C:
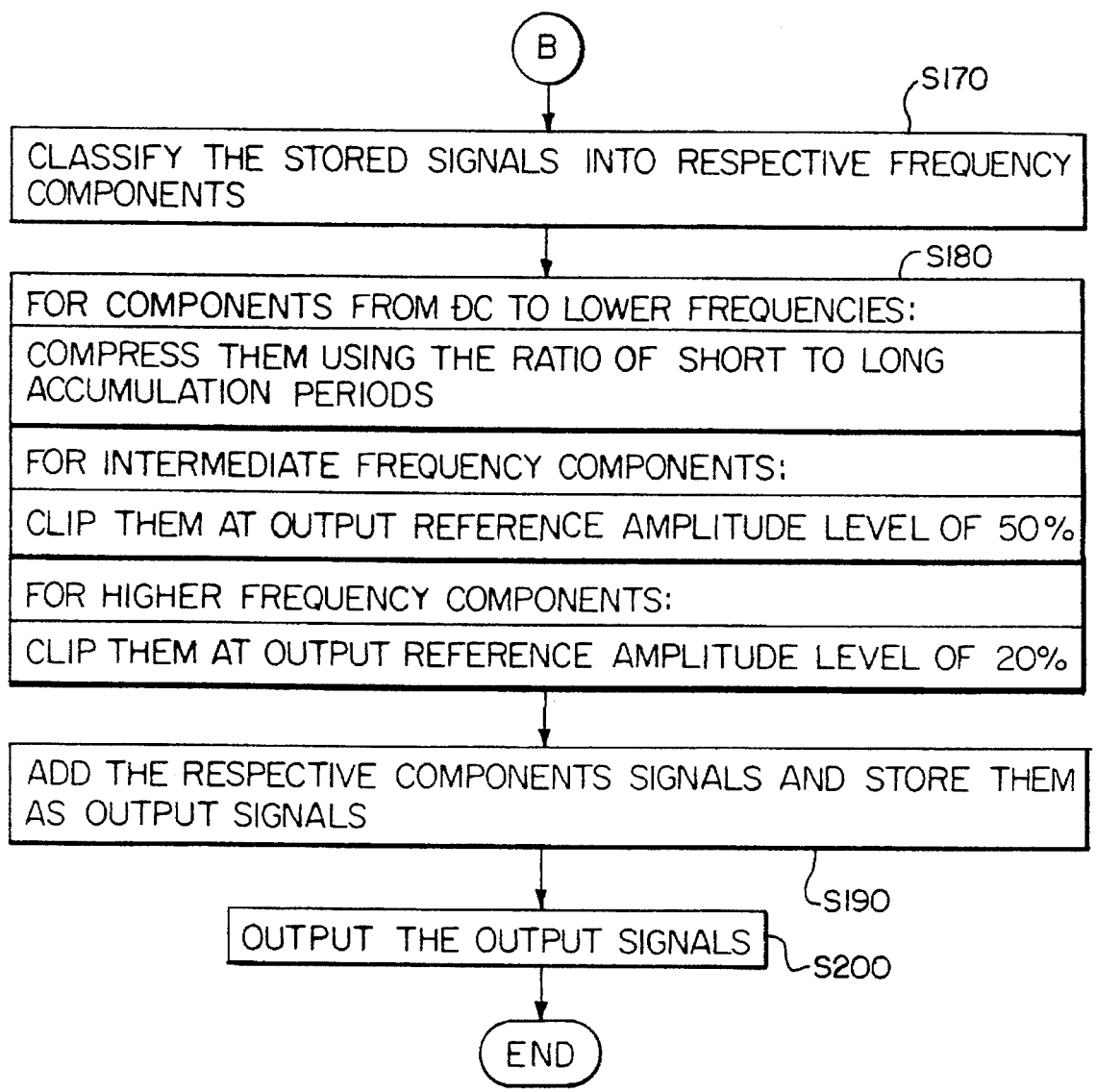

FIGS. 20A to 20C show respective steps of the above-described imaging and synthesizing method for a wide dynamic range. The method generally includes three stages: an image signal reading stage including steps S10–S90 of FIG. 20A; a level weighting stage including steps S100–S160 of FIG. 20B; and a level compressing stage including steps S170–S200 of FIG. 20C.

In the image signal reading stage, by controlling the CCD, a plurality of (two) images of different charge accumulation periods are taken. In the level weighting stage, the difference of the signal levels due to the different charge accumulation periods is corrected, and a larger weight is applied to a portion where the signal from the image is not saturated and has a sufficient S/N ratio. As a result, the two images can be combined smoothly (i.e., with keeping the continuity of signal levels without steep change). In the level compressing stage, the signal having a wide dynamic range and large amplitude is compressed based on the frequency components thereof, and converted into a standard signal level to be output.

In this way, by using a plurality of images with a narrow dynamic range which are obtained by controlling the charge accumulation periods of the CCD, an image with a widened dynamic range is produced. When the image is to be synthesized, portions of the image having a sufficient S/N ratio are selectively used, and in the switching portions from an image to another image, the weights are changed to synthesize the image smoothly. Thus, an image with a wide dynamic range and without unnaturalness can be produced. In addition, the image is compressed so that the details of the image are not largely influenced, and the change of the main portions of the image are not likely to be recognized. Therefore, even when the input levels are compressed to be the standard output level, no unnatural impression is felt, and a natural image with a widened dynamic range can be output.

EXAMPLE 2

Figure 7:
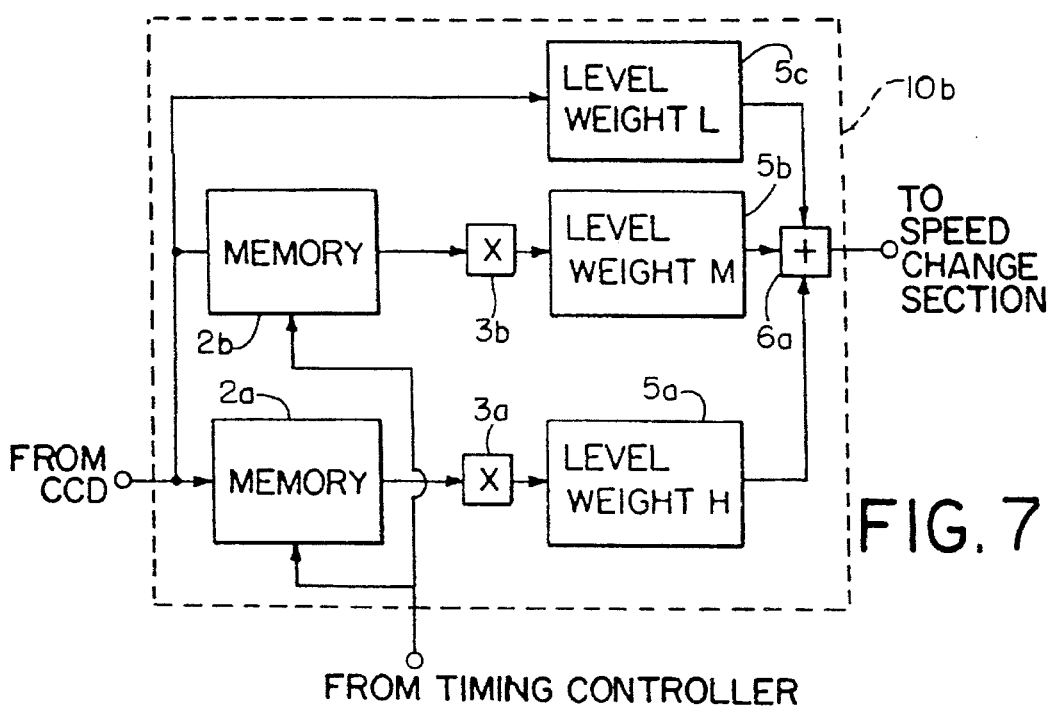
FIG. 7 is a block diagram showing a construction of an imaging device for a wide dynamic range in a second example according to the invention.
Figure 17:
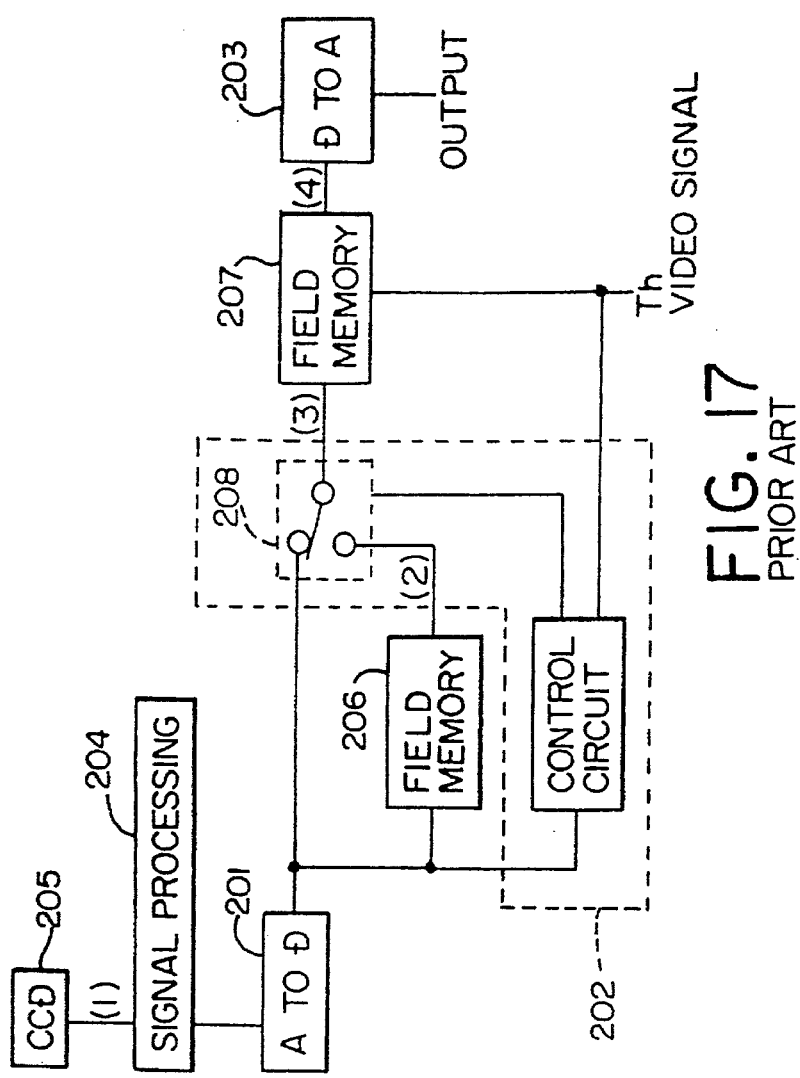
FIG. 17 shows an exemplary construction of a conventional imaging device.

A construction of an imaging method for a wide dynamic range and an imaging and synthesizing device for a wide dynamic range as a second example of the invention will be described below. The only difference from the first example is an image synthesizing section 10b. The other portions are basically the same as those in the first example. The image synthesizing section 10b in the second example is shown in FIG. 7. The image synthesizing section 10b includes memories 2a and 2b for accumulating images which are read out therefrom, multipliers 3a and 3b for multiplying signal levels by a constant, level weight H, M and L sections 5a–5c for applying weights to image signals, and an adder 6a for adding the image signals to each other. The operation of the imaging and synthesizing device of the second example having the above construction will be described below.

The drive timing of the imaging element (hereinafter referred to as CCD) 1 is shown in FIGS. 8A(1)–8A(v) and 8B(1)–8B(v). The second example is different from the first example in that the charge accumulation period is divided into three periods (a short period CS4, a medium period CM4, and a long period CL4), and image signals obtained in the three periods are synthesized. In addition, the charge accumulation periods for obtaining the image signals are set to be adjacent to each other (i.e., continuous). The periods CS4 and CM4 are adjacent (continuous) to the periods CM4 and CL4, respectively. The procedure for reading image signals from the photodiode in the CCD is the same as in the first example, so that the description of the procedure is omitted. However, after all the signal charges read into the vertical CCDs by the signal read pulse are transferred to the charge accumulation portions, next signal charge is read out. The period CS4 is started by applying a charge pull-out pulse for transmitting the charges in a direction perpendicular to the surface of the substrate of the CCD. By applying the charge pull-out pulse, the charges accumulated in the photodiodes are all transmitted to the substrate. From the timing at which the pulse is terminated, charges to be a signal are started to be accumulated.

The ratio of the charge accumulation periods corresponding to the level ratio of the image signal (CS4:CM4 and CM4:CL4) are set to be about 1:2 to 1:4. If the ratio is large, the dynamic range is wide. However, if the ratio is too large, noises are noticeable. FIGS. 8A(i)–8A(v) show, respectively, a driving timing for the charge pull-out pulse, the charge accumulation period, the signal read pulse, the signal charge high-speed transfer period and the signal readout period in the case where the charge accumulation periods are long, and FIGS. 8B(i)–8B(v) show, respectively, a corresponding driving timing for the respective signals in the case where the charge accumulation periods are short. In both cases, the accumulation periods are set to be continued. In the case where optimum exposure period (charge accumulation period) of the object which moves rapidly covers a plurality of periods, a continued image of the object the same as in the usual image can be obtained by continuing the respective charge accumulation periods. In another case where the charge accumulation periods are not continuous, a single object which moves rapidly may possibly be observed as plural separate objects.

In this way, the image signal is read out from the CCD 1, and the signal which is photoelectrically converted in the period CS4 is temporarily stored in the memory 2a and the signal which is photoelectrically converted in the period CM4 is stored in the memory 2b. The signal which is photoelectrically converted in the period CL4 is directly input into the level weight L section 5c. At the same time as the read of the signal of CL4, the signals of CS4 and CM4 which are temporarily stored in the memories 2a and 2b are read out and multiplied by coefficients which are in reverse proportion to the ratio of the charge accumulation periods in the multipliers 3a and 3b. Then, the modified signals are input into the level weight M section 5b and the level weight H section 5a, respectively. Specifically, if CL4:CM4≈1:3, the signal is multiplied by 3 in the multiplier 3b. If CL4:CS4≈1:9, the signal is multiplied by 9 in the multiplier 3a. The relationships between the level weights L, M and H and the input level in the level weight sections 5a to 5c are shown in FIG. 9. The respective level weights are determined so that portions of saturation and portions with low signal levels are not used. By applying such weights to the signals and adding the weighted signals by the adder 6a, the saturation or noise will not largely increase at each signal level, so that an image signal having a sufficiently wide dynamic range can be synthesized.

After the image signal is synthesized in this way, the scanning speed of the image signal is changed to be the usual speed (⅓), and the compression of signal level is performed. In this example, the γ correction which is used in the imaging device is used for the compression of signal level. In the first example, the signal is processed based on the frequency bands thereof. However, if the signal is used as a television signal, it is possible to accurately perform the γ correction. FIG. 10 shows the correction curve when γ≈0.45. At the output levels of 15% or lower, the gain (the ratio of input to output) becomes larger ten times or more. At the levels of 10% or lower, the gain becomes very larger twenty times or more. Therefore, in a usual imaging device, the maximum gain of the portion in which the input level is low is limited to about 6 times to 4 times (indicated by a dot-chain line and a broken line). Accordingly, the portions close to the black level become darker (i.e., the levels thereof are reduced). In addition, if it is attempted to accurately perform the γ correction, a large gain is applied and the S/N ratio is reduced. According to this invention, a signal without saturation can be obtained up to 900%. Therefore, by correlating the signal level of 600% in this invention to the γ correction input level of 100%, the total gain is very small, i.e., 3.33 times even when a gain of 20 times is applied. In other words, it is possible to accurately perform the γ correction with good S/N ratio. It is considered that noises are increased by the multiplication of the gain of 3 or 9 before the processing of the level weights M and H. However, according to the γ correction mentioned above, the signal portions with high gains of 3 or 9 times before the processing of the level weights M and H are compressed so that such high gains are reduced to gains of 2 to 3 times as total gains for the signals of respective charge accumulation periods. As a result, a very good total image quality can be obtained.

As described above, in the second example of the invention, the exposure period (the charge accumulation period) is divided into three periods, i.e., short, medium, and long periods, and the three periods are set to be adjacent to each other (i.e., continuous). Thus, the object which rapidly moves will not appear on a synthesized image separately (over-lapped). In addition, since the imaged signals are continuously synthesized to keep the linearity of the signal levels, a continuous signal corresponding to an image including portions from the dark to the light can be obtained. Moreover, when the imaging device is used for television, it is possible to perform an accurate γ correction, so that a signal of good S/N ratio can be obtained from the high signal level to the low signal level. Further, since the synthesis of the image with a wide dynamio range is performed linearly, a color image can be obtained by providing three units of the imaging devices corresponding to RGB. It is appreciated that in the first example, a color image can be obtained by applying the characteristics of the γ correction to the level compressing section.

EXAMPLE 3

An imaging method for a wide dynamic range and a construction of an imaging and synthesizing device for a wide dynamic range as a third example of the invention will be described. The third example is different from the first and second examples in that the CCD additionally includes color filters and the images output from the CCD are synthesized after the non-linear processing and signal processing required for the imaging device, and that the image synthesis is performed by using color difference signals of positive and negative polarities. The imaging and synthesizing device of the third example of the invention is shown in FIG. 11. In FIG. 11, elements which have the same functions as those in the previous examples are indicated by like reference numerals, and the descriptions thereof are omitted. The device of the third example includes an imaging element (CCD) 11 with color filters, a non-linear processing section 12, a luminance and color difference signals processing section 13, a memory 14 for storing image signals which are read out therefrom, multipliers 3c–3g for multiplying the signal level by a constant, weight and control L and H sections 15a and 15b for applying weights depending on the image signal levels and for outputting the weighted signal levels, adders 6b and 6c for adding the signals to each other, a speed changing section 7a for changing the speed of the image signals, a level compressing section 8a for compressing the image signal levels, a timing control section 9 for controlling the timing of each block, and a ratio calculation section 16 for calculating the ratio of the signal levels.

The operation of the device of the third example having the above construction will be described. The signal process from the CCD 11 to the luminance and color difference signals processing section 13 is the same as that in the usual video camera except for the speed of the signal processing. The signal processing is described in detail in The journal of the Institute of Television Engineers, Vol. 45, No. 9, 1991, pp. 1060–1066, and pp. 1080–1088, which is incorporated herein by reference. In addition, a method for controlling the charge accumulation periods of the CCD 11 and a method for reading the signal from the CCD 11 are the same as in the first and second examples. In order to control the charge accumulation periods, the reading speed is made so as to be 2 or 3 times higher than a usual reading speed. The CCD 11 includes color filters shown in FIG. 12 corresponding to pixels. Signals obtained through the color filters are added to and/or substracted from each other, whereby a luminance signal and color difference signals or RGB primary color signals are obtained. The non-linear processing section 12 controls a gain for a signal of each pixel unit so that the average signal level of the pixels of the CCD 11 become the output level of the γ correction. This is a simplified method of the γ correction. The thus obtained signals are averaged (band-limited), so as to obtain a luminance signal Y. The color difference signals R–Y and B–Y are obtained by performing the approximating operation based on Equations (1) and (2).

$$R-Y=(Mg+Ye)-(Cy+G) \tag{1}$$

$$B-Y=(Mg+Cy)-(Ye+G) \tag{2}$$

Alternatively, the signals R, B, and Y are obtained by Equations (3), (4), and (5), respectively, and then the color difference signals R–Y and B–Y are obtained.

$$R=½(Mg+Ye-Cy) \tag{3}$$

$$B=½(Mg+Cy-Ye) \tag{4}$$

$$Y=1/n(Mg+Ye+Cy+G) \tag{5}$$

n: a constant

In this way, the luminance signal and the color difference signals are synthesized. In this example, the operation speed is about twice as that compared with the usual speed, and the signal derived from the short charge accumulation period is written into the memory 14. The luminance signal derived from the long charge accumulation period is fed to the weight and control L section 15a. The color difference signals derived from the long charge accumulation period are output to the multiplier 3f. At the same time, the luminance signal and the color difference signals derived from the signal of the short charge accumulation period are read out from the memory 14, and first input into the multipliers 3c and 3d, where the levels thereof are compensated. A multiplying constant for level compensation depends on the ratio of the short and long charge accumulation periods and the γ correction value. The multiplying constant is set to be a value in the range of about 1.5 to 2.5. If the ratio of charge accumulation periods is represented by a (a<1) and the constant for the level compensation is represented by b, the constant b is expressed by Equation (6).

$$b=1/a^{-\gamma} \tag{6}$$

(where ⁻ indicates an exponent)
Thus, the constant b is set to be a value in the range of about 1.5 to 2.5. Based on the set value, a level difference due to the charge accumulation periods and the non-linear processing by the γ correction is corrected. The luminance signal of the short accumulation period whose level difference is corrected is input into the weight and control H section 15b. The characteristics of the weight and control L and H sections 15a and 15b are the same as shown in FIG. 4, respectively. The difference from the level weights L and H sections 4 and 5 in the first example is in that the weight value applied to the current luminance signal level is also output as a weight value. The weight value is output to the multipliers 3e and 3f so as to control the signal levels of the color difference signals. The reason why the levels of the color difference signals are controlled in the multipliers is that the levels of the color difference signals do not have a one-to-one relationship with respect to the signal levels output from the CCD 11. In this way, for the luminance signal and the color difference signals, the level variation due to the different charge accumulation periods and the non-linear processing by the γ correction are corrected. As a result, portions of the image signal without saturation and with good S/N ratio are extracted, added by the adders 6b and 6c, and synthesized. The speed of the synthesized signal is changed to the usual speed in the speed change section 7a. The level of the luminance signal whose speed has been changed is compressed in the same way as in the first example by the level compressing section 8a. The levels of the color difference signals are compressed by obtaining a ratio of the input to the output of the level compressing section 8a by the ratio calculation section 16, and by controlling the multiplier 3g based on the obtained ratio.

Also in the case where the color signals are superimposed on the respective pixel signals of the CCD, the charge accumulation periods of the CCD are controlled. After the luminance signal and the color difference signals are synthesized in each of the charge accumulation periods, the processing for expanding or compressing the dynamic range is performed. The levels of the color difference signals have no one-to-one relationship to the output signal levels of the CCD, so that the multiplication is performed using a weight in accordance with the processing for the luminance signal which has the one-to-one relationship to the output signal levels of the CCD. Thus, the processing for expanding or compressing the dynamic range is performed. The conversion from the pixel signals to the color difference signals is performed under the same conditions as those used in the usual imaging, except for the different operation speed. Since the processing for expanding the dynamic range is not included in the conversion, even when there is a slight error caused by the expansion of the dynamic range, the error will give almost no influence on the color difference signals.

As described above, in a single-board imaging device (using a single CCD) which most widely spreads for consumer use, the dynamic range which is the most critical problem for the performance of the device can be largely improved, so that the practical value of device is very high.

In the above examples of the invention, the ratio of the charge accumulation periods is 3 or 4. It is appreciated that other ratios can be used.

Figure 16C:
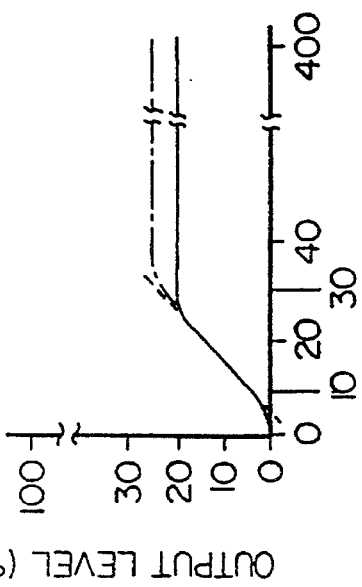

The characteristics of the level compression shown in the first example of the invention are only an exemplary one, and the characteristics thereof are not limited the specific characteristics. For the lower frequency components, a linear compression is performed in the first example. It is appreciated that, for example as shown in FIGS. 16A to 16C, by utilizing the characteristics of increasing the gains of the lower levels (FIG. 16A) of the signal such as the γ correction, portions where the γ characteristic is originally insufficient may be compensated. In addition, for the intermediate (FIG. 16B) and higher frequency (FIG. 16C) components, the characteristics are not limited to those described above. The characteristics for minimizing the deterioration in S/N ratio by using S-shaped characteristics can be realized.

The γ correction mentioned in the second example of the invention can be performed before the images are synthesized as in the third example of the invention.

Further, the γ correction in the third example is not limited to the simplified γ correction. It is appreciated that, after the signals Y, R, and B are separated, a normal γ correction can be performed.

In addition, the control method for the CCD described in the first example of the invention is only an exemplary one, and the method can be modified as shown in FIGS. 13A–13B and 14A–14E. FIGS. 13A–13E show, respectively, the timing signals for the charge pull-out pulse, charge accumulation period, signal read pulse, signal charge high-speed transfer period and signal readout period. Similarly, FIGS. 14A–14E show, respectively, the timing signals for the charge pull-out pulse, charge accumulation period, signal read pulse, signal charge high-speed transfer period and signal readout period.

Furthermore, in the above examples, a frame interline transfer (FIT) type CCD is used. Alternatively, an interline transfer (IL) type CCD can be used with a slight degradation in continuity of the charge accumulation periods. In such a case, the CCD is controlled as shown in FIGS. 15A–15H. FIGS. 15A–15D show, respectively, the timing for the charge pull-out pulse, charge accumulation period, signal read pulse and signal readout period. Similarly, FIGS. 15E–15H show, respectively, the timing for the charge pull-out pulse, charge accumulation period, signal read pulse and signal readout period. Since, in the control of the CCD shown in FIG. 13, the charge accumulation period corresponds to a half of the field period, the IL type CCD as well as the FIT type CCD can be used.

In the above examples, the invention is described by way of a device. It is appreciated that the present invention can be realized as a software (method) for performing the processing in a computer in accordance with the construction of the device.

As described above, according to the invention, by using a plurality of images with narrow dynamic ranges which are obtained by controlling the charge accumulation periods of the CCD, an image with a widened dynamic range is synthesized. When the image is to be synthesized, portions of the image having a sufficient S/N ratio are selectively used, and in the switching portions from an image to another image, the weights are changed so as to synthesize the image smoothly. Thus, an image with a wide dynamic range and without unnaturalness can be produced. In addition, the image is compressed so that the details of the image are not largely influenced, and the change of the mail portions of the image are not likely to be recognized. Therefore, even when the input levels are compressed to be the standard output level, unnatural impression is not felt, and a natural image with a widened dynamic range can be output.

As described above, in the second example of the invention, the exposure period (the charge accumulation period) is divided into three periods, i.e., short, medium, and long periods, and the three periods are set to be adjacent to each other (i.e., continuous). Thus, the object which rapidly moves will not appear on a synthesized image separately (overlapped). Thus, the dynamic range can be improved by about one order with respect to the conventional dynamic range. In addition, since the imaged signals are continuously synthesized to keep the linearity of the signal levels, a continuous signal corresponding to an image including portions from the dark to the light can be obtained. Moreover, when the imaging device is used for television, it is possible to perform an accurate γ correction, so that a signal of good S/N ratio can be obtained from the high signal level to the low signal level. Further, since the synthesis of the image with wide dynamic ranges is performed linearly, a color image can be obtained by providing three units of the imaging devices corresponding to RGB. It is appreciated that in the first example, a color image can be obtained by applying the characteristics of the γ correction to the level compression section.

As described above, in the third example of the invention, in a single-board color imaging device (using a single CCD)

which most widely spreads for consumer use, the dynamic range which is the most critical problem for the performance of the device can be largely improved.

As described above, according to the imaging and synthesizing method for a wide dynamic range and the imaging device for a wide dynamic range of the invention, the under dynamic range of the imaging device which constitutes a conventional problem to be solved can be eliminated, and a device capable of color imaging required for a video camera can be realized. Thus, the invention is very important in practical terms.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing an image with a wide dynamic range using an imaging element in which periods for accumulating charges can be varied in one field, said method comprising the steps of:

reading a charge stored in said imaging element in a first period of the field as a first signal;

reading a charge stored in said imaging element in a second period of the field as a second signal, said second period being different from said first period;

applying a first weight to said first signal so as to produce a weighted first signal, said first weight having a value in a range from 0 to 1 which is determined in accordance with a level of said first signal;

applying a second weight to said second signal so as to produce a weighted second signal, said second weight having a value in a range from 0 to 1 which is determined in accordance with a level of said second signal, and wherein, when said first period is shorter than said second period, said step of applying a first weight includes the step of applying a larger weight to a higher level of said first signal, and said step of applying a second weight includes the step of applying a larger weight to a lower level of said second signal;

producing a synthesized signal by adding said weighted first signal and said weighted second signal to each other; and compressing a level of said synthesized signal to a predetermined standard level.

2. A method according to claim 1, wherein in one field, said first period precedes said second period in time, and said first period is shorter than said second period.

3. A method according to claim 1, wherein said first period and said second period are substantially continuous or adjacent.

4. A method for producing an image with a wide dynamic range using an imaging element in which periods for accumulating charges can be varied in one field, said method comprising the steps of:

reading a charge stored in said imaging element in a first period of the field as a first signal;

reading a charge stored in said imaging element in a second period of the field as a second signal, said second period being different from said first period;

reading a charge stored in said imaging element in a third period of the field as a third signal, said third period being different from said first and second periods;

applying a first weight to said first signal so as to produce a weighted first signal, said first weight having a value in a range from 0 to 1 which is determined in accordance with a level of said first signal;

applying a second weight to said second signal so as to produce a weighted second signal, said second weight having a value in a range from 0 to 1 which is determined in accordance with a level of said second signal;

applying a third weight to said third signal so as to produce a weighted third signal, said third weight having a value in a range from 0 to 1 which is determined in accordance with a level of said third signal;

producing a synthesized signal by summing said weighted first signal, said weighted second signal, and said weighted third signal, and compressing a level of said synthesized signal to a predetermined standard level;

wherein, when said first period is shorter than said second period, and said second period is shorter than said third period, said step of applying a first weight includes the step of applying a larger weight to a higher level of said first signal, said step of applying a second weight includes the step of applying a larger weight to an intermediate level of said second signal, and said step of applying a third weight includes the step of applying a larger weight to a lower level of said third signal.

5. A method for producing an image with a wide dynamic range using an imaging element in which periods for accumulating charges can be varied in one field, said method comprising the steps of:

reading a charge stored in said imaging element in a first period of the field as a first signal;

reading a charge stored in said imaging element in a second period of the field as a second signal, said second period being different from said first period;

applying a first weight to said first signal so as to produce a weighted first signal, said first weight having a value in a range from 0 to 1 which is determined in accordance with a level of said first signal;

applying a second weight to said second signal so as to produce a weighted second signal, said second weight having a value in a range from 0 to 1 which is determined in accordance with a level of said second signal;

producing a synthesized signal by adding said weighted first signal and said weighted second signal to each other; and compressing a level of said synthesized signal to a predetermined standard level;

wherein said compressing step includes the steps of:

separating said synthesized signal based on respective frequency components;

compressing, for lower frequency components of said synthesized signal, said signal over all levels of said signal;

compressing, for intermediate frequency components of said synthesized signal, said signal when a level of said signal has a predetermined first value or less, and clipping said signal when the level of said signal exceeds said predetermined first value; and compressing, for higher frequency components of said synthesized signal, said signal when a level of said signal has a predetermined second value or less, and clipping said signal when the level of said signal exceeds said predetermined second value, said predetermined first value being larger than said predetermined second value.

6. An imaging device for producing an image with a wide dynamic range using an imaging element in which periods for accumulating charges can be varied in one field, said imaging device comprising:

means for reading a charge stored in said imaging element in a first period of the field as a first signal;

means for reading a charge stored in said imaging element in a second period of the field as a second signal, said second period being different from said first period;

means for applying a first weight to said first signal so as to produce a weighted first signal, said first weight having a value in a range from 0 to 1 which is determined in accordance with a level of said first signal;

means for applying a second weight to said second signal so as to produce a weighted second signal, said second weight having a value in a range from 0 to 1 which is determined in accordance with a level of said second signal, and wherein, when said first period is shorter than said second period, said means for applying a first weight applies a larger weight to a higher level of said first signal, and said means for applying a second weight applies a larger weight to a lower level of said second signal;

means for producing a synthesized signal by adding said weighted first signal and said weighted second signal to each other; and means for compressing a level of said synthesized signal to a predetermined standard level.

7. An imaging device according to claim 6, wherein in one field, said first period precedes said second period in time, and said first period is shorter than said second period.

8. An imaging device according to claim 6, wherein said first period and said second period are substantially continuous or adjacent.

9. An imaging device for producing an image with a wide dynamic range using an imaging element in which periods for accumulating charges can be varied in one field, said imaging device comprising:

means for reading a charge stored in said imaging element in a first period of the field as a first signal;

means for reading a charge stored in said imaging element in a second period of the field as a second signal, said second period being different from said first period;

means for reading a charge stored in said imaging element in a third period of the field as a third signal, said third period being different from said first and second periods;

means for applying a first weight to said first signal so as to produce a weighted first signal, said first weight having a value in a range from 0 to 1 which is determined in accordance with a level of said first signal;

means for applying a second weight to said second signal so as to produce a weighted second signal, said second weight having a value in a range from 0 to 1 which is determined in accordance with a level of said second signal;

means for applying a third weight to said third signal so as to produce a weighted third signal, said third weight having a value in a range from 0 to 1 which is determined in accordance with a level of said third signal;

means for producing a synthesized signal by summing said weighted first signal, said weighted second signal, and said weighted third signal, and means for compressing a level of said synthesized signal to a predetermined standard level;

wherein, when said first period is shorter than said second period, and said second period is shorter than said third period, said means for applying a first weight applies a larger weight to a higher level of said first signal, said means for applying a second weight applies a larger weight to an intermediate level of said second signal, and said means for applying a third weight applies a larger weight to a lower level of said third signal.

10. An imaging device for producing an image with a wide dynamic range using an imaging element in which periods for accumulating charges can be varied in one field, said imaging device comprising:

means for reading a charge stored in said imaging element in a first period of the field as a first signal;

means for reading a charge stored in said imaging element in a second period of the field as a second signal, said second period being different from said first period;

means for applying a first weight to said first signal so as to produce a weighted first signal, said first weight having a value in a range from 0 to 1 which is determined in accordance with a level of said first signal;

means for applying a second weight to said second signal so as to produce a weighted second signal, said second weight having a value in a range from 0 to 1 which is determined in accordance with a level of said second signal;

means for producing a synthesized signal by adding said weighted first signal and said weighted second signal to each other; and means for compressing a level of said synthesized signal to a predetermined standard level;

wherein said compressing means includes:

means for separating said synthesized signal based on respective frequency components;

means for compressing, for lower frequency components of said synthesized signal, said signal over all levels of said signal;

means for compressing, for intermediate frequency components of said synthesized signal, said signal when a level of said signal has a predetermined first value or less, and clipping said signal when the level of said signal exceeds said predetermined first value; and means for compressing, for higher frequency components of said synthesized signal, said signal when a level of said signal has a predetermined second value or less, and clipping said signal when the level of said signal exceeds said predetermined second value, said predetermined first value being larger than said predetermined second value.

* * * * *